United States Patent
Horita et al.

(10) Patent No.: US 10,228,042 B2
(45) Date of Patent: Mar. 12, 2019

(54) VIBRATION DAMPER

(71) Applicant: TOYOTA JIDOSHA KABUSHIKI KAISHA, Toyota-shi (JP)

(72) Inventors: Shuhei Horita, Numazu (JP); Fusahiro Tsukano, Susono (JP); Morihiro Matsumoto, Susono (JP); Hiroyuki Amano, Susono (JP); Tadashi Sekiguchi, Ashigara-gun (JP); Yuya Takahashi, Susono (JP); Taiki Nakamura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/287,954

(22) Filed: Oct. 7, 2016

(65) Prior Publication Data
US 2017/0114858 A1    Apr. 27, 2017

(30) Foreign Application Priority Data
Oct. 23, 2015 (JP) .................................. 2015-208794

(51) Int. Cl.
*F16F 15/14* (2006.01)
(52) U.S. Cl.
CPC ........ *F16F 15/145* (2013.01); *F16F 2222/08* (2013.01); *F16F 2232/02* (2013.01)
(58) Field of Classification Search
CPC ... F16F 15/145; F16F 2222/08; F16F 2232/02
See application file for complete search history.

(56) References Cited

U.S. PATENT DOCUMENTS 3,874,818 A * 4/1975 Saunders .............. B64C 27/001
                                                     416/144
5,495,924 A * 3/1996 Shaw ..................... F16F 15/145
                                                     188/378
(Continued)

FOREIGN PATENT DOCUMENTS

DE    10 2014 214 523 A1    2/2015
DE    10 2014 218 268 A1    4/2015
(Continued)

*Primary Examiner* — Vicky A Johnson
(74) *Attorney, Agent, or Firm* — Oblon, McClelland, Maier & Neustadt LLP

(57) ABSTRACT

There is provided a vibration damper which is capable of damping torsional vibrations by pendulum movement of a plurality of inertial masses, and damping vibrations of plurality of order without letting the inertial masses to interfere.

A distance between a center of curvature of an inner surface of a first through-hole and a center of curvature of an inner surface of a second through-hole formed in a rotary member is shorter than a distance between a center of curvature of an inner surface of a fifth through-hole and a center of curvature of an inner surface of a sixth through-hole formed in a first inertial mass. Moreover, a distance between a center of curvature of an inner surface of a third through-hole and a center of curvature of an inner surface of a fourth through-hole in a rotary member is longer than a distance between a center of curvature of an inner surface of a seventh through-hole and a center of curvature of an inner surface of an eighth through-hole formed in a second inertial mass.

1 Claim, 6 Drawing Sheets

(56) References Cited

U.S. PATENT DOCUMENTS

| | | | | |
|---|---|---|---|---|
| 2011/0186395 A1* | 8/2011 | Bai | ..................... | F16F 15/145 |
| | | | | 188/378 |
| 2011/0195794 A1* | 8/2011 | Bai | ......................... | F16D 3/12 |
| | | | | 464/66.1 |
| 2014/0352290 A1 | 12/2014 | Horita et al. | | |
| 2015/0252872 A1 | 9/2015 | Schnaedelbach et al. | | |

FOREIGN PATENT DOCUMENTS

| | | |
|---|---|---|
| DE | 10 2014 211 740 A1 | 12/2015 |
| EP | 2 833 018 A1 | 2/2015 |
| GB | 598811 | 2/1948 |
| JP | 2014-504351 | 2/2014 |
| WO | WO 2013/118293 A1 | 8/2013 |
| WO | WO 2014/180477 A1 | 11/2014 |

\* cited by examiner

VIBRATION DAMPER

The present application claims the benefit of Japanese Patent Application No. 2015-208794 filed on Oct. 23, 2015 with the Japanese Patent Office, the disclosure of which is incorporated herein by reference in its entirety.

BACKGROUND

Field of the Disclosure

Embodiments of the present application relate to a vibration damper which is an apparatus for damping torsional vibrations of a rotary member such as a crank shaft and a power transmission shaft, and particularly to an apparatus which damps the torsional vibrations by reciprocating of inertial masses by the torsional vibrations.

Discussion of the Related Art

In JP-A-2014-504351 and PCT International publication No. 2013/118293, torsional-vibration dampers which include a rotary member having a disc shape, coupled with a rotary shaft, and inertial masses that are arcuate, provided four each in a circumferential direction on both sides of the rotary member, have been described. Each inertial mass is coupled with the rotary member to be able to undergo a pendulum movement in the circumferential direction of the rotary member. A plurality of recesses having an arcuate surface which is convex toward an outer side in a radial direction are formed at a predetermined interval in the circumferential direction. In each inertial mass, two recesses having a contact surface which is convex toward an inner side in the radial direction are arranged side-by-side in the circumferential direction. A pin is inserted through the recesses formed in the rotary member and the recesses formed in the inertial mass. The inertial mass provided to one side surface of the rotary member and the inertial mass provided to the other side surface of the rotary member are coupled, and the pendulum movement of the inertial mass is guided by the pin.

In the vibration damper described in PCT International publication No. 2013/118293, for preventing an end portion of the inertial mass from being protruded out from an outer edge of the rotary member when the inertial mass undergoes pendulum movement, a distance between centers of curvature of the contact surfaces of the recesses formed in the rotary member is larger than a distance between centers of curvature of the contact surfaces of the recesses formed in the inertial masses.

In each conventional vibration damper, an arrangement is made such that vibration of a predetermined order that has been determined in advance in design is damped. Consequently, when a torque of the rotary member changes, the plurality of inertial masses fitted to the rotary member undergo the pendulum movement in the same direction almost simultaneously. When such type of vibration damper is used to prevent the torsional vibrations of an engine in which the number of combustion cylinders can be changed, since the primary vibration mode changes in accordance with the number of combustion cylinders, an initial vibration damping performance cannot be achieved in one of the anteroposterior number of the combustion cylinders to be changed. In other words, the conventional vibration damper has no feature other than single vibration damping.

In a vibration damper that damps the vibrations of a rotary member by pendulum movement of inertial masses, a square root of ratio of a dimension from a center of rotation of the rotary member up to a center of pendulum movement of the inertial mass and a radius of pendulum movement of the inertial mass is equivalent to an order of vibration to be damped. Consequently, when the radius of pendulum movement of one of the plurality of inertial masses fitted to the rotary member is let to differ from the radius of pendulum movement of the other inertial mass, it is possible to achieve a vibration damper having a plurality of vibration damping features. However, in such vibration damper, since a cycle and a phase of vibration of each inertial mass differ when the vibration is generated in the torque of the rotary member, there is a possibility of collision of the inertial masses thereby causing noise, or degradation of vibration damping performance.

SUMMARY

Aspects of the present disclosure have been conceived noting the foregoing technical problems, and it is therefore an object of the present application to provide a vibration damper which is capable of damping the torsional vibrations by the pendulum movement of the plurality of inertial masses, and damping vibrations of a plurality of order without letting the inertial masses to interfere.

In order to achieve the object, embodiments of the present application provide a vibration damper that includes a rotary member which rotates with a predetermined central axis as a center of rotation, and at least two inertial masses which are disposed side-by-side on the rotary member, in a circumferential direction of the rotary member, at locations separated apart on an outer side in a radial direction from the central axis of the rotary member, wherein the rotary member has a first through-hole having an inner surface that is convex toward the outer side in the radial direction, a second through-hole which is adjacent to the first through-hole in the circumferential direction, and has an inner surface that is convex toward the outer side in the radial direction, a third through-hole which is formed on an opposite side in the circumferential direction of the first through-hole, sandwiching the second through-hole between the first through-hole and the third through-hole, and has an inner surface that is convex toward the outer side in the radial direction, and a fourth through-hole which is adjacent to the third through-hole in the circumferential direction, and has an inner surface that is convex toward the outer side in the radial direction, formed therein, and a first inertial mass of the two inertial masses has a fifth through-hole having an inner surface that is convex toward an inner side in the radial direction, and a sixth through-hole which is adjacent to the fifth through-hole in the circumferential direction, and has an inner surface that is convex toward the inner side in the radial direction, formed therein, and a second inertial mass of the two inertial masses has a seventh through-hole having an inner surface that is convex toward the inner side in the radial direction, and an eighth through-hole which is adjacent to the seventh through-hole in the circumferential direction, and has an inner surface that is convex toward the inner side in the radial direction, formed therein, and the first inertial mass is disposed such that at least a portion of the first through-hole and a portion of the sixth through-hole overlap the first through-hole and the second through-hole, and a first pin that is to be pinched between the inner surface of the fifth through-hole and the inner surface of the first through-hole is inserted into the fifth through-hole and the first through-hole, and a second pin that is to be pinched between the inner surface of the sixth through-hole and the inner surface of the second through-hole is inserted into the sixth through-hole and the second through-hole, and held to be capable of undergoing pendulum movement with respect to the rotary member by the first pin and the second pin, and the second inertial mass is disposed such that at least a portion of the seventh through-hole and a portion of the eighth through-hole overlap the third through-hole and the fourth through-hole, and a third pin that is to be pinched between the inner surface of the seventh through-hole and the inner surface of the third through-hole is inserted into the seventh through-hole and the third through-hole, and a fourth pin that is to be pinched between the inner surface of the eighth through-hole and the inner surface of the fourth through-hole is inserted into the eighth through-hole and the fourth through-hole, and held to be capable of undergoing pendulum movement with respect to the rotary member by the third pin and the fourth pin, and a distance between a center of curvature of the inner surface of the first through-hole and a center of curvature of the inner surface of the second through-hole is shorter than a distance between a center of curvature of the inner surface of the fifth through-hole and a center of curvature of the inner surface of the sixth through-hole, and a distance between a center of curvature of the inner surface of the third through-hole and a center of curvature of the inner surface of the fourth through-hole is longer than a distance between a center of curvature of the inner surface of the seventh through-hole and a center of curvature of the inner surface of the eighth through-hole.

In a non-limiting embodiment, either at least any one of the through-holes formed in the rotary member or a least any one of the through-holes formed in the first inertial mass and the second inertial mass may be sector-shaped.

In a non-limiting embodiment, either at least any one of the through-holes formed in the rotary member or at least any one of the through-holes formed in the first inertial mass and the second inertial mass may be arcuate.

In a non-limiting embodiment, either at least any one of the through-holes formed in the rotary member or at least any one of the through-holes formed in the first inertial mass and the second inertial mass may be elliptical, and when the first inertial mass and the second inertial mass move toward the outer side in the radial direction by a centrifugal force, and when the first inertial mass and the second inertial mass are positioned at a center of a range of pendulum movement of the first inertial mass and the second inertial mass, a center of curvature of an inner surface which is elliptical may include a center of curvature of each portion that comes in contact with the first pin, the second pin, the third pin, and the fourth pin.

According to the embodiments of the present application, the distance between the center of curvature of the inner surface of the first through-hole and the center of curvature of the inner surface of the second through-hole formed in the rotary member is shorter than the distance between the center of curvature of the inner surface of the fifth through-hole and the center of curvature of the inner surface of the sixth through-hole formed in the first inertial mass, and the distance between the center of curvature of the inner surface of the third through-hole and the center of curvature of the inner surface of the fourth through-hole formed in the rotary member is longer than the distance between the center of curvature of the inner surface of the seventh through-hole and the center of curvature of the inner surface of the eighth through-hole formed in the second inertial mass. Consequently, the cycle and the phase of each inertial mass when the first inertial mass and the second inertial mass have undergone pendulum movement differ mutually. For instance, when the first inertial mass approaches the second inertial mass, an end portion in the circumferential direction of the first inertial mass on the side of the second inertial mass undergoes pendulum movement to move toward an inner side of the rotary member, and when the second inertial mass approaches the first inertial mass, an end portion in the circumferential direction of the second inertial mass on the side of the first inertial mass undergoes pendulum movement to move toward an outer side of the rotary member. Therefore, a function of damping vibrations of different order is carried out. Moreover, even when the first inertial mass and the second inertial mass undergo pendulum movement to approximate, it is possible to avoid contact or interference of the first inertial mass and the second inertial mass. Moreover, since the inertial masses do not make mutual contact or interfere mutually, it is possible to make the inertial masses large. As a result, it is possible to improve damping capability of the vibration damper.

BRIEF DESCRIPTION OF THE DRAWINGS

Features, aspects, and advantages of exemplary embodiments of the present disclosure will become better understood with reference to the following description and accompanying drawings, which should not limit the application in any way.

DETAILED DESCRIPTION OF THE PREFERRED EMBODIMENTS

Figure 1:
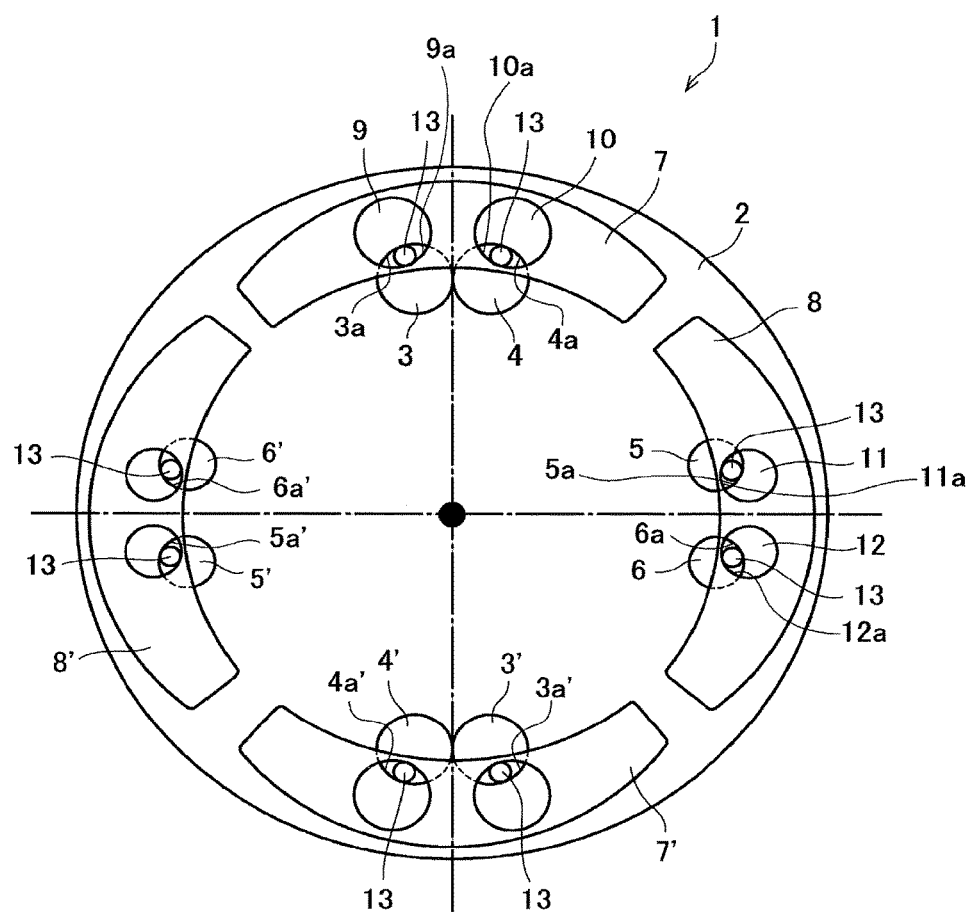
FIG. 1 is a front view for explaining an example of an arrangement of a vibration damper according to an example of the present application.

Preferred embodiments of the present application will now be explained with reference to the accompanying drawings. A front view for explaining an example of an arrangement of a vibration damper according to an embodiment of the present application is shown in FIG. 1. A vibration damper 1 shown in FIG. 1 damps torsional vibrations of a rotary shaft such as an input shaft of a transmission, or a crank shaft of an engine not shown in the drawing. A rotary member 2 having a disc shape is integrated with a rotary shaft to rotate with a central axis of the rotary shaft as a center of rotation. The rotary member 2 has four circular-shaped through-holes formed therein. Specifically, in an outer circumferential portion of the rotary member 2, a first through-hole 3 having a large inner diameter and a second through-hole 4 having a diameter same as the diameter of the first through-hole 3 are formed to be mutually adjacent in a circumferential direction. Another first through-hole 3' and another second through-hole 4' having similar shapes are formed at point-symmetric positions with respect to the first through-hole 3 and the second through-hole 4 with a center of rotation of the rotary member 2 as a center.

Moreover, a third through-hole 5 having a diameter smaller than a diameter of the first through-hole 3 and the second through-hole 4 is formed on an opposite side of the first through-hole 3 sandwiching the second through-hole 4 in the circumferential direction of the rotary member 2. A fourth through-hole 6 having a same shape as the third through-hole 5 is formed adjacently on an opposite side of the second through-hole 4 sandwiching the third through-hole 5. Furthermore, another third through-hole 5' and another fourth through-hole 6' having similar shapes are formed at point-symmetric positions with respect to the third through-hole 5 and the fourth through-hole 6 with a center of rotation of the rotary member 2 as a center.

First inertial masses 7 and 7' and second inertial masses 8 and 8' which are arcuate, are disposed on a front surface of the abovementioned rotary member 2, and four inertial masses not shown in the drawing which are arcuate, are disposed similarly on a rear surface of the rotary member 2. The shape and mass of each inertial mass provided on the front surface of the rotary member 2 and the rear surface of the rotary member 2 being same, only an arrangement on a front-surface side of the rotary member 2 will be described below. The inertial masses 7, 8, 7', and 8' oscillate due to an angular acceleration being generated in the rotary member 2 by fluctuation of a torque acting on the rotary member 2. Specifically, the first inertial mass 7 is disposed on a portion on an outer side in the radial direction of the front surface of the rotary member 2, and a fifth through-hole 9 and a sixth through-hole 10 having a circular shape and an inner diameter almost same as an inner diameter of the first through-hole 3 and the second through-hole 4 are formed on two sides of the first inertial mass 7, sandwiching a central portion in the circumferential direction of the rotary member 2. At least a portion of the fifth through-hole 9 and a portion of the sixth through-hole 10 overlap the first through-hole 3 and the second through-hole 4. The first inertial mass 7 and the first inertial mass 7' are provided at positions point-symmetric with the center of rotation of the rotary member 2 as a center.

Moreover, a second inertial mass 8 and a second inertial mass 8' which are arcuate are disposed between the first inertial mass 7 and the first inertial mass 7' respectively, in the circumferential direction of the rotary member 2. A seventh through-hole 11 and an eighth through-hole 12 having a circular shape and an inner diameter almost same as the inner diameter of the third through-hole 5 and the fourth through-hole 6 are formed on two sides sandwiching a central potion in the circumferential direction, in the second inertial mass 8. At least a portion of the through-holes 11 and 12 overlap the third through-hole 5 and the fourth through-hole 6. The second inertial mass 8 and the second inertial mass 8' are provided at positions point-symmetric with the center of rotation of the rotary member 2 and a center.

In the first inertial mass 7, pins 13 are pivotably inserted into an overlapping portion of the first through-hole 3 and the fifth through-hole 9 and an overlapping portion of the second through-hole 4 and the sixth through-hole 10. Similarly, in the second inertial mass 8, pins 13 are pivotably inserted into an overlapping portion of the third through-hole 5 and the seventh through-hole 11 and an overlapping portion of the fourth through-hole 6 and the eighth through-hole 12.

Figure 2:
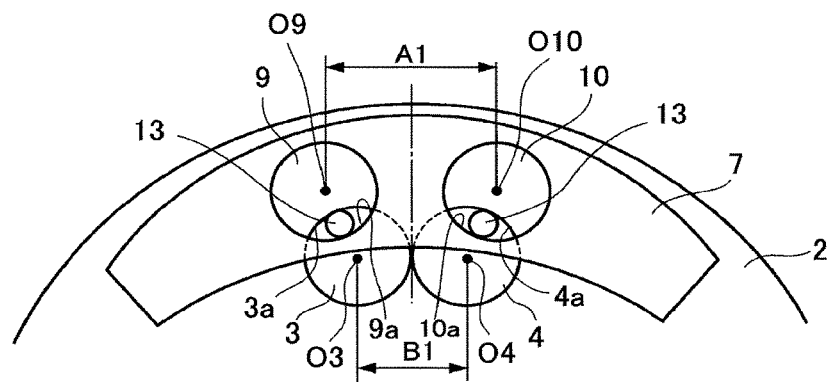
FIG. 2 is an enlarged view for explaining a positional relationship of through-holes formed in a first inertial mass and through-holes formed in a rotary member.

The inertial masses 7, 7', 8, and 8' having the abovementioned arrangement are moved toward an outer side in the radial direction by a centrifugal force that is exerted by the rotation of the rotary member 2, and accordingly, the pins 13 are pinched between the through-holes 3, 3', 4, 4', 5, 5', 6, and 6' formed in the rotary member 2 and the through-holes 9, 10, 11, and 12 formed in the inertial masses 7, 7', 8, and 8'. In the pinched state, when the torque of the rotary member 2 fluctuates and an angular acceleration is generated in the rotary member 2, the inertial masses 7, 7', 8, and 8' oscillate in the circumferential direction, and the pins 13 roll between inner surfaces 3a, 3a', 4a, 4a', 5a, 5a', 6a, and 6a' (hereinafter, 'inner surfaces 3a to 6a') of the through-holes 3, 3', 4, 4', 5, 5', 6, and 6' formed in the rotary member 2 and inner surfaces 9a, 10a, 11a, and 12a (hereinafter, 'inner surfaces 9a to 12a') of the through-holes 9, 10, 11, and 12 formed in the inertial masses 7, 7', 8, and 8'. Here, the inner surfaces 3a to 6a' and the inner surfaces 9a to 12a are surfaces on which the pins 13 roll and make contact as described below. Consequently, the inner surfaces 3a to 6a' in the rotary member 2 are curved surfaces that are convex toward the outer side in the radial direction of the rotary member 2, and the inner surfaces 9a to 12a in the inertial masses 7 to 8' are curved surfaces that are convex toward an inner side (toward the center) in the radial direction of the rotary member 2. Moreover, as shown in FIG. 2, the pin 13 interposed between the first through-hole 3 and the fifth through-hole 9 rolls relatively along a raceway surface which is a portion convexed toward the outer side of the rotary member 2 of the inner surface 3a of the first through-hole 3 and a raceway surface which is a portion convexed toward the center of the rotary member 2 of the inner surface of the fifth through-hole 9. In other words, the inertial mass 7 is pivotably held with respect to the rotary member 2 by two pins 13, and a supporting point of the inertial mass 7 changes due to each pin 13 rolling along the inner surfaces 3a, 4a, 9a, and 10a. As a result, the inertial mass 7 oscillates with respect to the rotary member 2.

An engine not shown in the drawing is coupled with the rotary member 2. The engine has a plurality of cylinders, and the number of cylinders that carry out combustion of fuel can be changed. In other words, the engine is a variable-cylinder engine. Therefore, an order of vibration of an engine torque differs when running with all the cylinders and when running with lesser number of cylinders with the number of combustion cylinders reduced. For instance, in a case in which, a secondary vibration is generated when running with all the cylinders, a primary vibration is generated in a case in which, the number of combustion cylinders is reduced to half. In the abovementioned vibration damper, by a mode of holding by the rotary member 2 of the pair of first inertial masses 7 and 7' being different from a mode of holding by the rotary member 2 of the pair of second inertial masses 8 and 8', a vibration damping effect for two types of vibrations with different order is emanated.

To explain specifically, as shown in FIG. 2, by letting a distance B1 between curvature centers O3 and O4 of the first through-hole 3 and the second through-hole 4 holding the first inertial mass 7 via the pin 13 and a distance B2 between curvature centers O5 and O6 of the third through-hole 5 and the fourth through-hole 6 holding the second inertial mass 8 via the pin 13 to be different, it is possible to let to differ a length of pendulum in a case of pendulum movement when the first inertial masses 7 and 7' oscillate and a length of pendulum in a case of pendulum movement when the second inertial masses 8 and 8' oscillate. As it has been known widely, since a square root of a ratio of a distance from the center of rotation of the rotary member 2 up to a center of oscillation of the inertial masses 7, 7', 8, and 8' signifies an order of vibration, an order of vibration that is damped by oscillating of the first inertial masses 7 and 7' and an order of vibration that is damped by oscillating of the second inertial masses 8 and 8' differ. When it is assumed that a length of pendulum changes continuously during oscillation, it is possible to generate a damping effect with respect to vibrations of a plurality of orders by one type of inertial masses having same structure.

To describe a case of using the vibration damper for damping a ripple or fluctuation in the torque generated in a four-cylinder engine, when running operating with all the cylinders, a torque pulse is generated twice per rotation. The number of oscillations per rotation of the second inertial mass is adjusted such that the number of oscillations per rotation is a frequency of the torque pulse. In this case, for adjusting the number of oscillations per rotation of the second inertial mass 8 to be two, a distance from the center or rotation of the rotary member 2 up to a curvature center of an orbit in which a center of gravity of the second inertial mass 8 oscillates, and a radius of curvature of the orbit in which the center of gravity of the second inertial mass 8 oscillates have been specified. Specifically, the distance from the center of rotation of the rotary member 2 up to the curvature center of the orbit in which the center of gravity of the second inertial mass 8 oscillates has been adjusted such that a square root of a value obtained by dividing the radius of curvature of the orbit in which the center of gravity of the second inertial mass 8 oscillates becomes '2'. More specifically, for example, a diameter and a position of the third through-hole 5 and the fourth through-hole 6 formed in the rotary member 2 and the seventh through-hole 11 and the eighth through-hole 12 formed in the second inertial mass 8 are adjusted such that the number of oscillations per rotation of the second inertial mass becomes the frequency of torque pulse per rotation when all the cylinders are run.

In the vibration damper 1, the first inertial mass 7 and the second inertial mass 8 are disposed to be adjacent, and the number of oscillations per rotation of the first inertial mass 7 differ from the number of oscillations per rotation of the second inertial mass 8. Consequently, the cycle and the phase of oscillation of each of the inertial masses 7 and 8 differ mutually. Therefore, a direction of oscillation of the first inertial mass 7 and a direction of oscillation of the second inertial mass 8 are mutually opposite, and sometimes, the first inertial mass 7 and the second inertial mass 8 mutually approximate instantaneously.

In such case, to avoid the first inertial mass 7 and the second inertial mass 8 from interfering or making a contact, in the example shown in FIG. 1, end portions in the circumferential direction of the first inertial masses 7 and 7' move toward the inner side in the radial direction of the rotary member 2, and end portions of the second inertial masses 8 and 8' facing the end portions of the first inertial masses 7 and 7' in the circumferential direction move toward the outer side in the radial direction of the rotary member 2.

Figure 3:
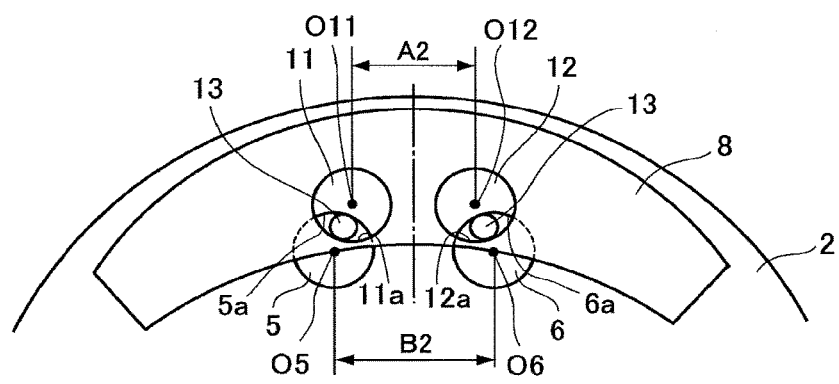
FIG. 3 is an enlarged view for explaining a positional relationship of through-holes formed in a second inertial mass and through-holes formed in a rotary member.

To explain specifically, as shown in FIG. 2, a distance A1 between centers O9 and O10 of the fifth through-hole 9 and the sixth through-hole 10 formed in the first inertial mass 7 is longer than the distance B1 between centers of the first through-hole 3 and the second through-hole 4 formed in the rotary member 2. On the other hand, as shown in FIG. 3, a distance A2 between centers O11 and O12 of the seventh through-hole 11 and the eighth through-hole 12 formed in the second inertial mass 8 is shorter than the distance B2 (>B1) between the centers of the third through-hole 5 and the fourth through-hole 6 formed in the rotary member 2.

Figure 4:
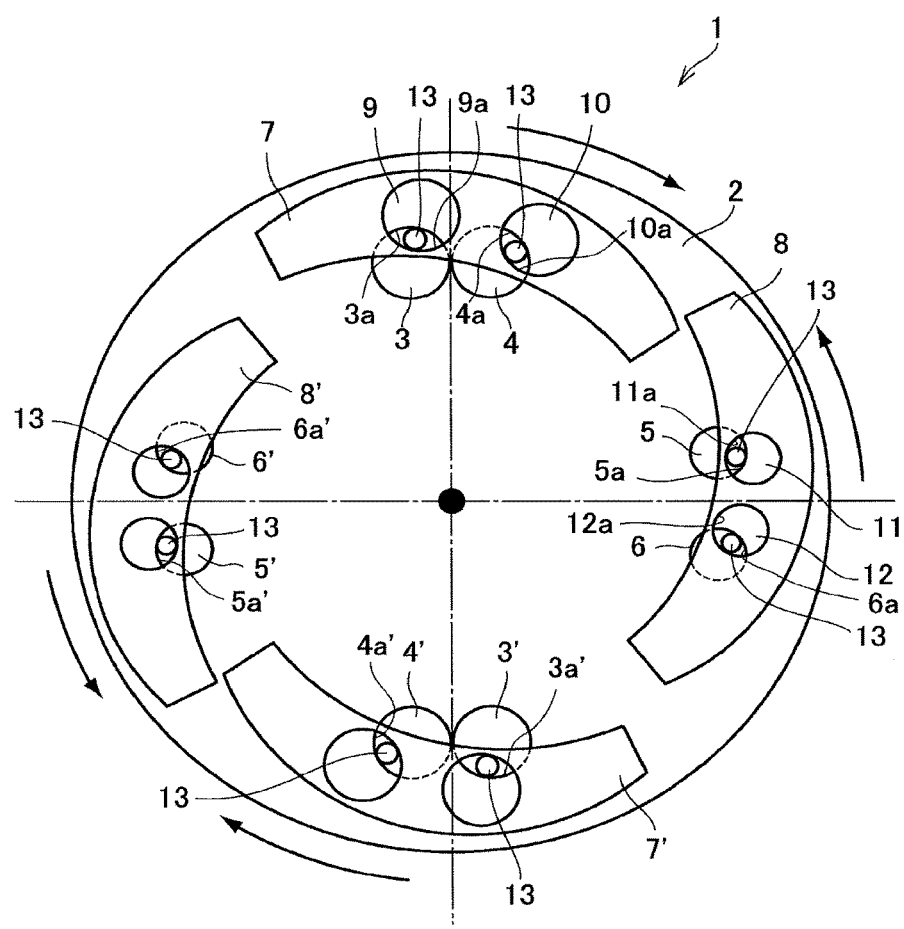
FIG. 4 is a front view for explaining a state when the inertial masses undergo pendulum movement.

In FIG. 4, a state in which the inertial masses 7, 7', 8, and 8' oscillate due to the ripple of the torque transmitted to the rotary member 2 is shown. By the distances between the centers of the through-holes being set or adjusted as mentioned above, when the first inertial mass 7 has moved in a direction of coming closer to the second inertial mass 8, an end portion toward the second inertial mass 8 out of the end portions in the circumferential direction of the first inertial mass 7 moves toward the center of rotation of the rotary member 2. In other words, the center of pendulum movement or an instantaneous center of the first inertial mass 7 is toward the center of the rotary member 2 of the first inertial mass 7, and the first inertial mass 7 undergoes pendulum movement with the center of pendulum movement or instantaneous center as the center of oscillation. Moreover, when the second inertial mass 8 oscillates in a direction of coming closer to the first inertial mass 7, of the end portions in the circumferential direction of the second inertial mass 8, an end portion toward the first inertial mass 7 moves toward the outer side of the rotary member 2. In other words, the center of pendulum movement or an instantaneous center of the second inertial mass 8 is toward the outer side in the radial direction of the rotary member 2 of the second inertial mass 8, and second inertial mass 8 undergoes pendulum movement with the center of pendulum movement or instantaneous center as the center of oscillation. Therefore, even in a case in which, the direction of oscillation of the first inertial mass 7 and the direction of oscillation of the second inertial mass 8 become mutually opposite, and the first inertial mass 7 and the second inertial mass 8 approximate, the direction of movement of the end portions of the first inertial mass 7 and the end portions of the second inertial mass 8 being different in the radial direction of the of the rotary member 2, it is possible to prevent the first inertial mass 7 and the second inertial mass 8 from interfering mutually or from making a contact, and to further prevent a noise generated due to collision of the first inertial mass 7 and the second inertial mass 8.

In such manner, since it is possible to avoid the end portion of the first inertial mass 7 and the end portion of the second inertial mass 8 from making a contact, it is possible to dispose the first inertial mass 7 and the second inertial mass 8 mutually closely in the circumferential direction of the rotary member 2. In other words, by narrowing the distance between the first inertial mass 7 and the second inertial mass 8, it is possible to make the inertial masses 7 and 8 large-sized, and to improve the vibration damping performance of the vibration damper 1. Particularly, by making large a mass of each of the inertial masses 7 and 8, it is possible to improve the vibration damping performance for vibrations of comparatively low frequency.

As described above, the number of oscillations per rotation of the first inertial mass 7 being smaller than the number of oscillations per rotation of the second inertial mass 8, a width of oscillation of the first inertial mass 7 is larger than a width of oscillation of the second inertial mass 8. However, since the end portion of the first inertial mass 7 oscillates toward the inner side of the rotary member 2, even when the first inertial mass 7 is made large-sized, it is possible to prevent the end portion of the first inertial mass 7 from protruding out from an outer edge of the rotary member 2.

Figure 5:
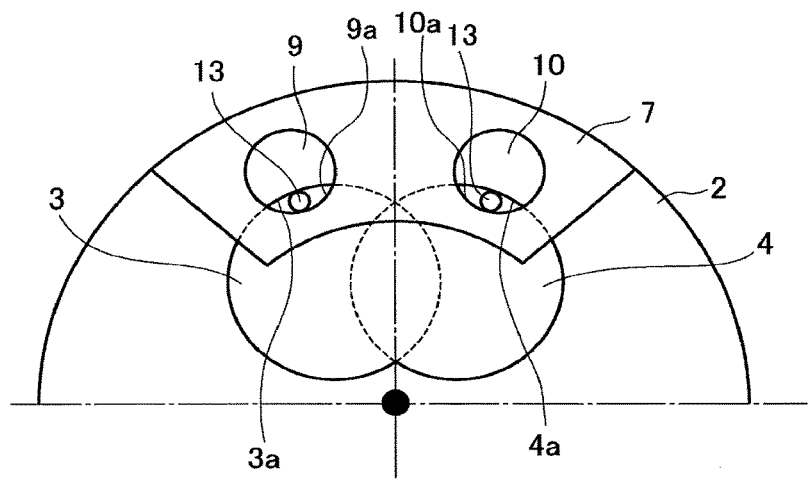
FIG. 5 is an enlarged view showing an example in which, an inner diameter of the through-holes formed in the first inertial mass and an inner diameter of the through-holes formed in the rotary member are let to differ.

In an example of the present application, the inner diameter of each of the first through-hole 3 and the second through-hole 4 (or each of the third through-hole 5 and the fourth through-hole 6) formed in the rotary member 2 may be let to differ from the inner diameter of each of the fifth through-hole 9 and the sixth through-hole 10 formed in the first inertial mass 7 (or each of the seventh through-hole 11 and the eighth through-hole 12 formed in the second inertial mass 8). Specifically, the inner diameter of each of the fifth through-hole 9 and the sixth through-hole 10 formed in the first inertial mass 7 may be made smaller than the inner diameter of each of the first through-hole 3 and the second through-hole 4 formed in the rotary member 2 as shown in FIG. 5.

Figure 6:
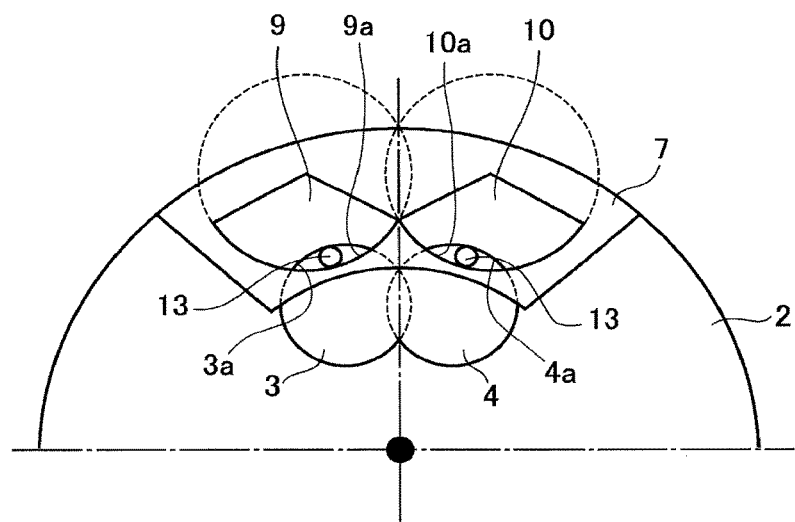
FIG. 6 is an enlarged view showing an example in which the through-hole formed in the first inertial mass is sector-shaped.

Moreover, the inner diameter of each of the fifth through-hole 9 and the sixth through-hole 10 formed in the first inertial mass 7 may be made larger than the inner diameter of each of the first through-hole 3 and the second through-hole 4 formed in the rotary member 2. Furthermore, it is preferable that the fifth through-hole 9 and the sixth through-hole 10 formed in the first inertial mass 7 have a surface that oscillates when the pin 13 makes a contact, and the shape is not restricted to be circular. Specifically, the fifth through-hole 9 and the sixth through-hole 10 formed in first inertial mass 7 are formed to be sector-shaped as shown in FIG. 6, and a radius of each of the fifth through-hole 9 and the sixth through-hole 10 may be larger than a radius of each of the first through-hole 3 and the second through-hole 4. By forming the fifth through-hole 9 and the sixth through-hole 10 to be sector-shaped, it is possible to make the radius of each of the fifth through-hole 9 and the sixth through-hole 10 large.

Figure 7:
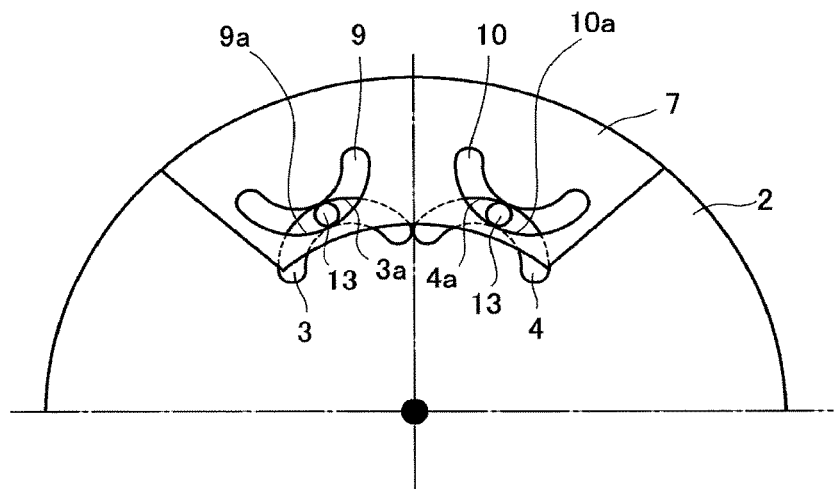
FIG. 7 is an enlarged view showing an example in which, the through-hole formed in each of the first inertial mass and the rotary member is a slit that is arcuate.

Furthermore, the fifth through-hole 9 and the sixth through-hole 10 formed in the first inertial mass 7 may be formed as arcuate slits, and the first through-hole 3 and the second through-hole 4 formed in the rotary member 2 may be formed as arcuate slits as shown in FIG. 7. Even when the fifth through-hole 9 and the sixth through-hole 10 formed in the first inertial mass 7 and the first through-hole 3 and the second through-hole 4 formed in the rotary member 2 are formed to be arcuate slits, since a surface with which the pin 13 makes a contact is an arcuate inner surface, it is possible to carry out positioning of the pins 13 in the radial direction of the rotary member 2.

Figure 8:
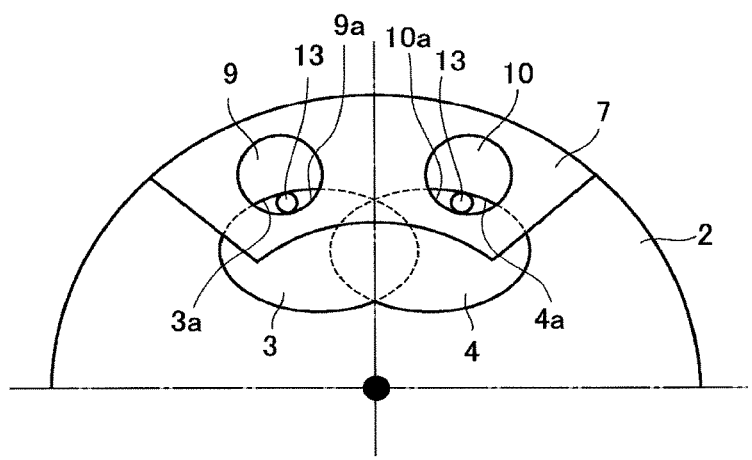
FIG. 8 is an enlarged view showing an example in which, the shape of the through-holes formed in the rotary member is elliptical.
Figure 9:
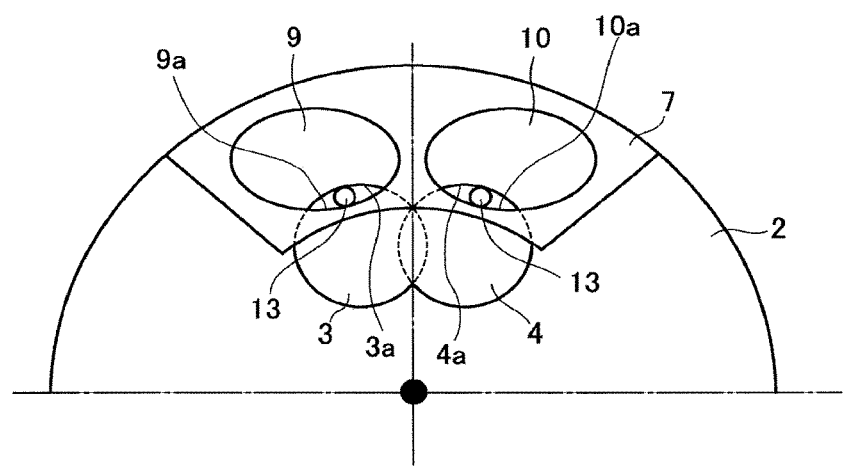
FIG. 9 is an enlarged view showing an example in which, the shape of through-holes formed in the first inertial mass is elliptical.
Figure 10:
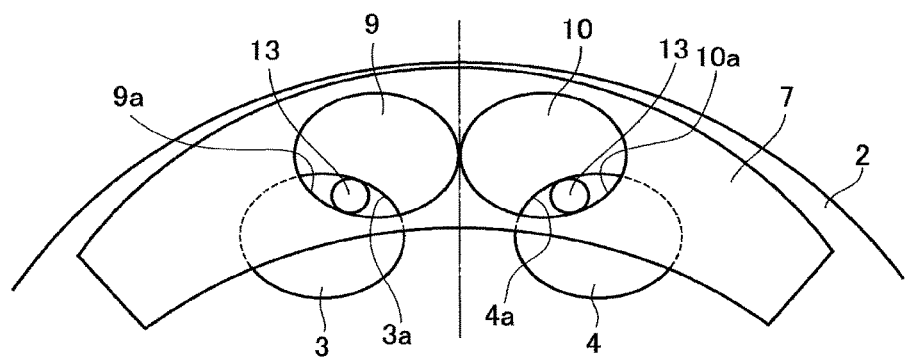
FIG. 10 is an enlarged view showing an example in which, the shape of the through-holes formed in the first inertial mass and the rotary member is elliptical.

The first through-hole 3 and the second through-hole 4 formed in the rotary member 2 may be elliptical as shown in FIG. 8. Or, the fifth through-hole 9 and the sixth through-hole 10 formed in the first inertial mass 7 may be elliptical as shown in FIG. 9. Or, the fifth through-hole 9 and the sixth through-hole 10 formed in the first inertial mass 7 and the first through-hole 3 and the second through-hole 4 formed in the rotary member 2 may be elliptical as shown in FIG. 10.

In a case in which the first through-hole 3 and the second through-hole 4 are elliptical, the shape may be such that, when the first inertial mass 7 moves toward outer side in the radial direction by a centrifugal force, and when the first inertial mass 7 is positioned at a center of a range in which the first inertial mass 7 oscillates, a distance between curvature centers of portions of the inner surfaces of the first through-hole 3 and the second through-hole 4 formed in the rotary member 2 with which the pins 13 make contact becomes shorter than a distance between centers of the fifth through-hole 9 and the sixth through-hole 10 formed in the first inertial mass 7.

Moreover, in a case in which, the fifth through-hole 9 and the sixth through-hole 10 are elliptical, the shape may be such that, when the first inertial mass 7 moves toward the outer side in the radial direction by the centrifugal force, and when the first inertial mass 7 is positioned at the center of the range in which the first inertial mass 7 oscillates, a distance between curvature centers of portions of the inner surfaces of the fifth through-hole 9 and the sixth through-hole 10 formed in the first inertial mass 7 with which the pins 13 make contact becomes longer than a distance between centers of the first through-hole 3 and the second through-hole 4 formed in the rotary member 2.

Although the above exemplary embodiments of the present application have been described, it will be understood by those skilled in the art that the present application should not be limited to the described exemplary embodiments, and various changes and modifications can be made within the spirit and scope of the present application. For example, the shape of the seventh through-hole 11 and the eighth through-hole 12 formed in the second inertial mass 8, and the shape of the through-holes 3', 4', 5, 5', 6, and 6' formed in the rotary member 2 may be an arrangement shown in drawings from FIG. 3 to FIG. 8.

What is claimed is:
1. A vibration damper, comprising:
   a rotary member which rotates with a predetermined central axis as a center of rotation; and
   at least two inertial masses which are disposed side-by-side on the rotary member, in a circumferential direction of the rotary member, at locations separated apart on an outer side in a radial direction from the central axis of the rotary member, wherein
   the rotary member has a first through-hole having an inner surface that is convex toward the outer side in the radial direction, a second through-hole which is adjacent to the first through-hole in the circumferential direction, and has an inner surface that is convex toward the outer side in the radial direction, a third through-hole which is formed on an opposite side in the circumferential direction of the first through-hole, sandwiching the second through-hole between the first through-hole and the third through-hole, and has an inner surface that is convex toward the outer side in the radial direction, and a fourth through-hole which is adjacent to the third through-hole in the circumferential direction, and has an inner surface that is convex toward the outer side in the radial direction, formed therein,
   a first inertial mass of the two inertial masses has a fifth through-hole having an inner surface that is convex toward an inner side in the radial direction, and a sixth through-hole which is adjacent to the fifth through-hole in the circumferential direction, and has an inner surface that is convex toward the inner side in the radial direction, formed therein,
   a second inertial mass of the two inertial masses has a seventh through-hole having an inner surface bulged toward the inner side in the radial direction, and an eighth through-hole which is adjacent to the seventh through-hole in the circumferential direction, and has an inner surface that is convex toward the inner side in the radial direction, formed therein,
   the first inertial mass is disposed such that at least a portion of the fifth through-hole and a portion of the sixth through-hole overlap the first through-hole and the second through-hole respectively, a first pin that is to be pinched between the inner surface of the fifth through-hole and the inner surface of the first through-hole is inserted into the fifth through-hole and the first through-hole, and a second pin that is to be pinched between the inner surface of the sixth through-hole and the inner surface of the second through-hole is inserted into the sixth through-hole and the second through-hole, and held to be capable of undergoing pendulum movement with respect to the rotary member by the first pin and the second pin, the second inertial mass is disposed such that at least a portion of the seventh through-hole and a portion of the eighth through-hole overlap the third through-hole and the fourth through-hole respectively, a third pin that is to be pinched between the inner surface of the seventh through-hole and the inner surface of the third through-hole is inserted into the seventh through-hole and the third through-hole, and a fourth pin that is to be pinched between the inner surface of the eighth through-hole and the inner surface of the fourth through-hole is inserted into the eighth through-hole and the fourth through-hole, and held to be capable of undergoing pendulum movement with respect to the rotary member by the third pin and the fourth pin, a distance between a center of curvature of the inner surface of the first through-hole and a center of curvature of the inner surface of the second through-hole is shorter than a distance between a center of curvature of the inner surface of the fifth through-hole and a center of curvature of the inner surface of the sixth through-hole, a distance between a center of curvature of the inner surface of the third through-hole and a center of curvature of the inner surface of the fourth through-hole is longer than a distance between a center of curvature of the inner surface of the seventh through-hole and a center of curvature of the inner surface of the eighth through-hole, wherein either at least any one of the through-holes formed in the rotary member or at least any one of the through-holes formed in the first inertial mass and the second inertial mass is elliptical, and when the first inertial mass and the second inertial mass move toward the outer side in the radial direction due to a centrifugal force, and when the first inertial mass and the second inertial mass are positioned at a center of a range of pendulum movement of the first inertial mass and the second inertial mass, a center of curvature of an inner surface which is elliptical includes a center of curvature of each portion that comes in contact with the first pin, the second pin, the third pin, and the fourth pin.

* * * * *